(12) United States Patent
Nakayama

(10) Patent No.: US 11,674,482 B2
(45) Date of Patent: Jun. 13, 2023

(54) OUTBOARD MOTOR AND VESSEL

(71) Applicant: YAMAHA HATSUDOKI KABUSHIKI KAISHA, Iwata (JP)

(72) Inventor: Koichi Nakayama, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 17/886,520

(22) Filed: Aug. 12, 2022

(65) Prior Publication Data

US 2023/0096971 A1 Mar. 30, 2023

(30) Foreign Application Priority Data

Sep. 30, 2021 (JP) .............................. JP2021-161123

(51) Int. Cl.
| | |
|---|---|
| *F02M 35/16* | (2006.01) |
| *F02B 61/04* | (2006.01) |
| *F02B 29/04* | (2006.01) |
| *B63H 20/02* | (2006.01) |

(52) U.S. Cl.
CPC ....... *F02M 35/167* (2013.01); *F02B 29/0418* (2013.01); *F02B 61/045* (2013.01); *B63H 20/02* (2013.01)

(58) Field of Classification Search
CPC . F02M 35/167; F02B 29/0418; F02B 61/045; B63H 20/02
See application file for complete search history.

(56) References Cited

U.S. PATENT DOCUMENTS

2018/0100431 A1* 4/2018 Ochiai ................ B63H 20/001

FOREIGN PATENT DOCUMENTS

JP          3829553 B2     10/2006

\* cited by examiner

*Primary Examiner* — Brandon D Lee
(74) *Attorney, Agent, or Firm* — Keating and Bennett, LLP

(57) ABSTRACT

An outboard motor includes an engine, a pressure charger, an intercooler, a bypass air passage, and an air bypass valve to open and close the bypass air passage. The engine includes a cylinder block and an air intake passage and an exhaust passage both of which are connected to the cylinder block. The pressure charger is located in the air intake passage. The intercooler is located in the air intake passage between the cylinder block and the pressure charger. A first end of the bypass air passage is connected to a region of the air intake passage upstream of the pressure charger. A second end of the bypass air passage is connected to a region of the air intake passage downstream of the pressure charger. The air bypass valve is directly attached to the intercooler.

10 Claims, 10 Drawing Sheets

OUTBOARD MOTOR AND VESSEL

CROSS REFERENCE TO RELATED APPLICATIONS

This application claims the benefit of priority to Japanese Patent Application No. 2021-161123 filed on Sep. 30, 2021. The entire contents of this application are hereby incorporated herein by reference.

BACKGROUND OF THE INVENTION

1. Field of the Invention

The present invention relates to an outboard motor and a vessel including the outboard motor.

2. Description of the Related Art

An outboard motor described in Japanese Patent No. 3829553 includes an engine, a drive shaft extending downwardly from a crankshaft of the engine, a propeller shaft coupled to the drive shaft through a bevel gear, and a propeller attached to the propeller shaft. The rotation of the crankshaft is transmitted to the propeller shaft through the drive shaft and through the bevel gear, and then the propeller shaft rotates along with the propeller. An air intake passage connected to an intake port of a cylinder block is provided around the cylinder block of the engine, and a pressure charging device, an intercooler, and the like are provided in the air intake passage. The pressure charging device is a supercharger driven by the rotation of the crankshaft. External air that has flowed into the air intake passage is pressurized in the pressure charging device, and is then cooled in the intercooler, and is then supplied to a combustion chamber located in the cylinder block through the intake port.

SUMMARY OF THE INVENTION

The inventor of preferred embodiments of the present invention described and claimed in the present application conducted an extensive study and research regarding an outboard motor and a vessel, such as the one described above, and in doing so, discovered and first recognized new unique challenges and previously unrecognized possibilities for improvements as described in greater detail below.

In an outboard motor provided with a pressure charging device, such as that of Japanese Patent No. 3829553, there is a case in which, for example, the number of components or weight will increase because of the presence of the pressure charging device, etc., and therefore improvements are desired to be produced so as to reduce the number of components or reduce weight of an arrangement relative to the pressure charging device, etc.

Preferred embodiments of the present invention provide outboard motors each having a novel structural arrangement of a pressure charger, and vessels including the outboard motors.

In order to overcome the previously unrecognized and unsolved challenges described above, a preferred embodiment of the present invention provides an outboard motor including an engine, a propeller to be driven by the engine, a pressure charger, an intercooler to cool air compressed by the pressure charger, a bypass air passage, and an air bypass valve to open and close the bypass air passage. The engine includes a cylinder block, an air intake passage connected to the cylinder block, an exhaust passage connected to the cylinder block, and a crankshaft extending along a vertical direction in the cylinder block. The outboard motor includes a drive shaft joined to the crankshaft and extending along the vertical direction, a propeller shaft that extends in a horizontal direction and joined to the propeller, and a first transmission to transmit rotation of the drive shaft to the propeller shaft. The pressure charger is located in the air intake passage to compress air flowing through the air intake passage. The intercooler is located in the air intake passage between the cylinder block and the pressure charger. The bypass air passage includes a first end connected to a region of the air intake passage upstream of the pressure charger and a second end connected to a region of the air intake passage downstream of the pressure charger. The bypass air passage bypasses the pressure charger. The air bypass valve is directly attached to the intercooler.

With this structural arrangement, in the outboard motor, the rotation of the crankshaft of the engine is transmitted to the propeller shaft through the drive shaft and through the first transmission, and, as a result, the propeller shaft rotates together with the propeller, and therefore the propeller generates a thrust. Air that has been taken into the air intake passage connected to the cylinder block of the engine is compressed by the pressure charger, is then cooled by the intercooler, and is used for combustion in the cylinder block. When the air bypass valve is opened, a portion of the air supplied to a region (which is hereinafter referred to as a "downstream region") of the air intake passage downstream of the pressure charger flows through the bypass air passage, and bypasses the pressure charger, and thus returns to a region of the air intake passage (which is hereinafter referred to as an "upstream region") upstream of the pressure charger. This makes it possible to adjust the pressure in the downstream region, i.e., to adjust a charging pressure by the opening degree of the air bypass valve. Additionally, if there is no need to compress and supply air to the cylinder block, a difference between the pressure of the downstream region and the pressure of the upstream region is reduced by opening the air bypass valve, and therefore it is possible to lessen a burden imposed on the pressure charger. Thus, the outboard motor has a novel structure in which the air bypass valve is attached directly to the intercooler especially in the arrangement relative to the pressure charger. Therefore, additional components, such as a bracket by which the air bypass valve is fixed to the cylinder block, become needless, and therefore it is possible to reduce the number of components and to reduce weight, thus making it possible to make the outboard motor compact.

In a preferred embodiment of the present invention, the second end of the bypass air passage is connected to the intercooler, and the bypass air passage includes a return passage that returns a portion of air guided to the intercooler to a region of the air intake passage upstream of the pressure charger.

With this structural arrangement, when the air bypass valve is opened, it is possible to return a portion of the air guided to the intercooler in the air supplied to the downstream region to the upstream region with the bypass air passage. If air guided to the intercooler is air cooled by the intercooler, air that has become a comparatively low temperature by being cooled is able to flow through the bypass air passage, and therefore the air bypass valve and the bypass air passage are not required to have high heat-resisting properties, and low-cost components are able to be used.

In a preferred embodiment of the present invention, the intercooler includes a housing provided with a female screw. The air bypass valve is provided with an insertion hole. The air bypass valve is directly attached to the intercooler by fastening a bolt through the insertion hole and into the female screw.

This structural arrangement enables an operator who assembles the outboard motor to easily attach the air bypass valve directly to the intercooler by inserting the bolt into the insertion hole and then fastening the bolt to the female screw.

In a preferred embodiment of the present invention, the intercooler is located laterally of the cylinder block. A projection that projects toward the cylinder block and that reinforces the intercooler is provided at a portion of the housing to which the air bypass valve is connected.

With this structural arrangement, the intercooler is reinforced by the projection provided at a connection portion to which the air bypass valve is connected in the housing of the intercooler, and therefore it is possible to improve the rigidity of the intercooler.

In a preferred embodiment of the present invention, the pressure charger may include a supercharger driven by rotation of the crankshaft.

In a preferred embodiment of the present invention, the outboard motor further includes a second transmission that joins the crankshaft and the supercharger together so that the supercharger always operates while the crankshaft is rotating.

With this structural arrangement, in a situation in which the supercharger operating in accordance with the rotation of the crankshaft is not required to compress air and to supply compressed air to the engine, a difference between the pressure of the downstream region and the pressure of the upstream region becomes small as described above when the air bypass valve is opened. Therefore, it is possible to lessen a burden imposed on the supercharger.

In a preferred embodiment of the present invention, the pressure charger may include a turbocharger driven by an exhaust gas passing through the exhaust passage.

In a preferred embodiment of the present invention, the cylinder block may include a plurality of cylinders spaced apart along the vertical direction.

A preferred embodiment of the present invention provides an outboard motor including an engine, a propeller to be driven by the engine, a pressure charger, an intercooler to cool air compressed by the pressure charger, a bypass air passage, and an air bypass valve to open and close the bypass air passage. The engine includes a cylinder block, an air intake passage connected to the cylinder block, an exhaust passage connected to the cylinder block, and a crankshaft located in the cylinder block. The pressure charger is located in the air intake passage and compresses air flowing through the air intake passage. The intercooler is located in the air intake passage between the cylinder block and the pressure charger. The bypass air passage includes a first end connected to a region of the air intake passage upstream of the pressure charger and a second end connected to a region of the air intake passage downstream of the pressure charger. The bypass air passage bypasses the pressure charger. The air bypass valve is directly attached to the intercooler.

With this structural arrangement, it is possible to provide an outboard motor having a novel structure in the arrangement especially relative to a pressure charger.

A preferred embodiment of the present invention provides a vessel including a hull and the outboard motor provided on the hull. With this structural arrangement, it is possible to provide a vessel that includes an outboard motor having a novel structure in the arrangement especially relative to a pressure charger.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
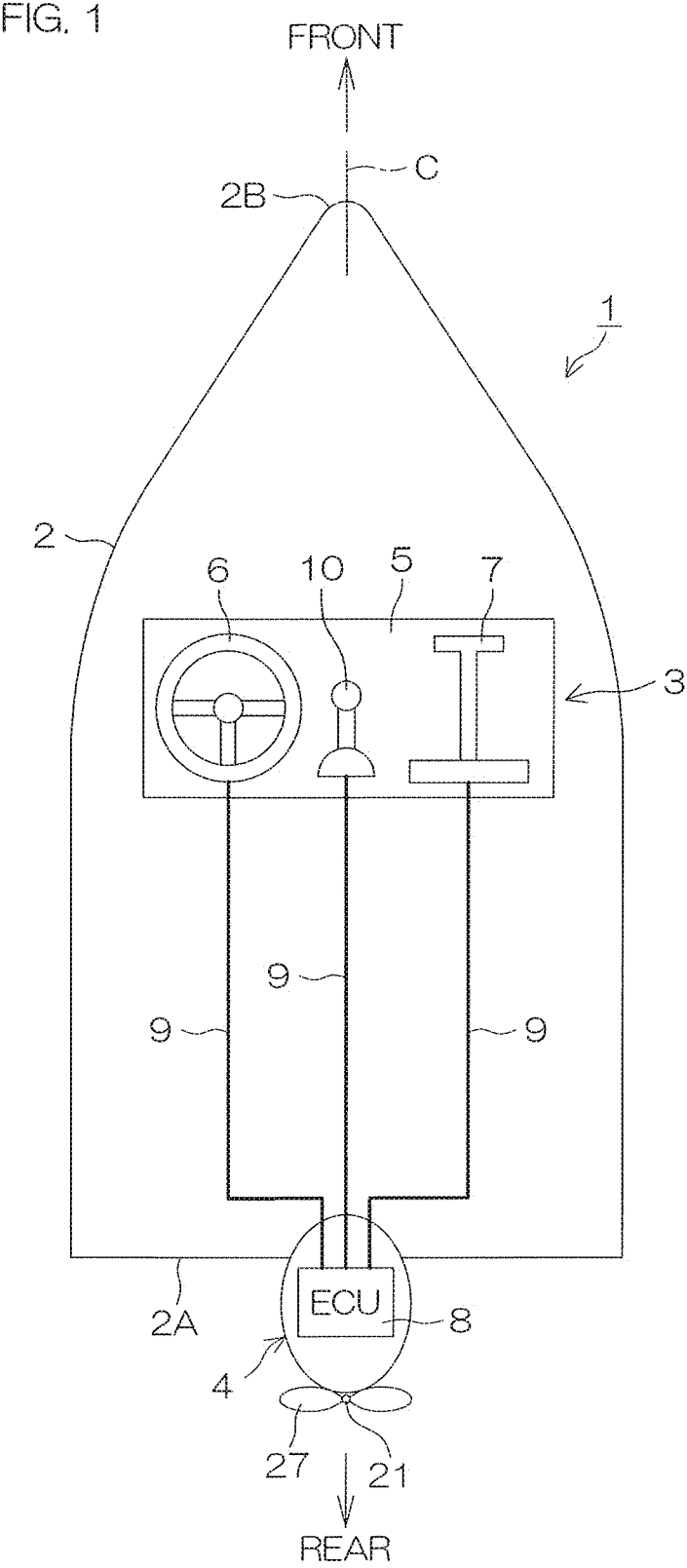
FIG. 1 is a schematic plan view of a vessel according to a preferred embodiment of the present invention.

FIG. 1 is a schematic plan view of a vessel 1 according to a preferred embodiment of the present invention. The vessel 1 includes a hull 2, a vessel operation device 3 mounted in the hull 2, and an outboard motor 4. An example of the vessel operation device 3 includes a steering wheel 6 and a throttle lever 7 both of which are provided at an operational platform 5 around a vessel operation seat of the hull 2, and a communication bus 9 that connects an ECU (electronic control unit) 8 built into the outboard motor 4 and the steering wheel 6 and the throttle lever 7 together. A vessel operator turns the steering wheel 6 in a left-right direction to steer the vessel 1. The vessel operator turns the throttle lever 7 in a front-rear direction to adjust the output of the outboard motor 4. A joystick 10 that is operated by the vessel operator to steer and adjust an output of the outboard motor 4 may be provided at the operational platform 5.

A single or a plurality of outboard motors 4 is/are provided. If a single outboard motor 4 is provided, the outboard motor 4 is attached to a transom stern 2A of the hull 2 on a virtual center line C that passes through the transom stern 2A and a bow 2B of the hull 2 along the front-rear direction. If a plurality of outboard motors 4 are provided, the outboard motors 4 are attached to the transom stern 2A at bilaterally symmetrical positions, respectively, with respect to the center line C.

Figure 2:
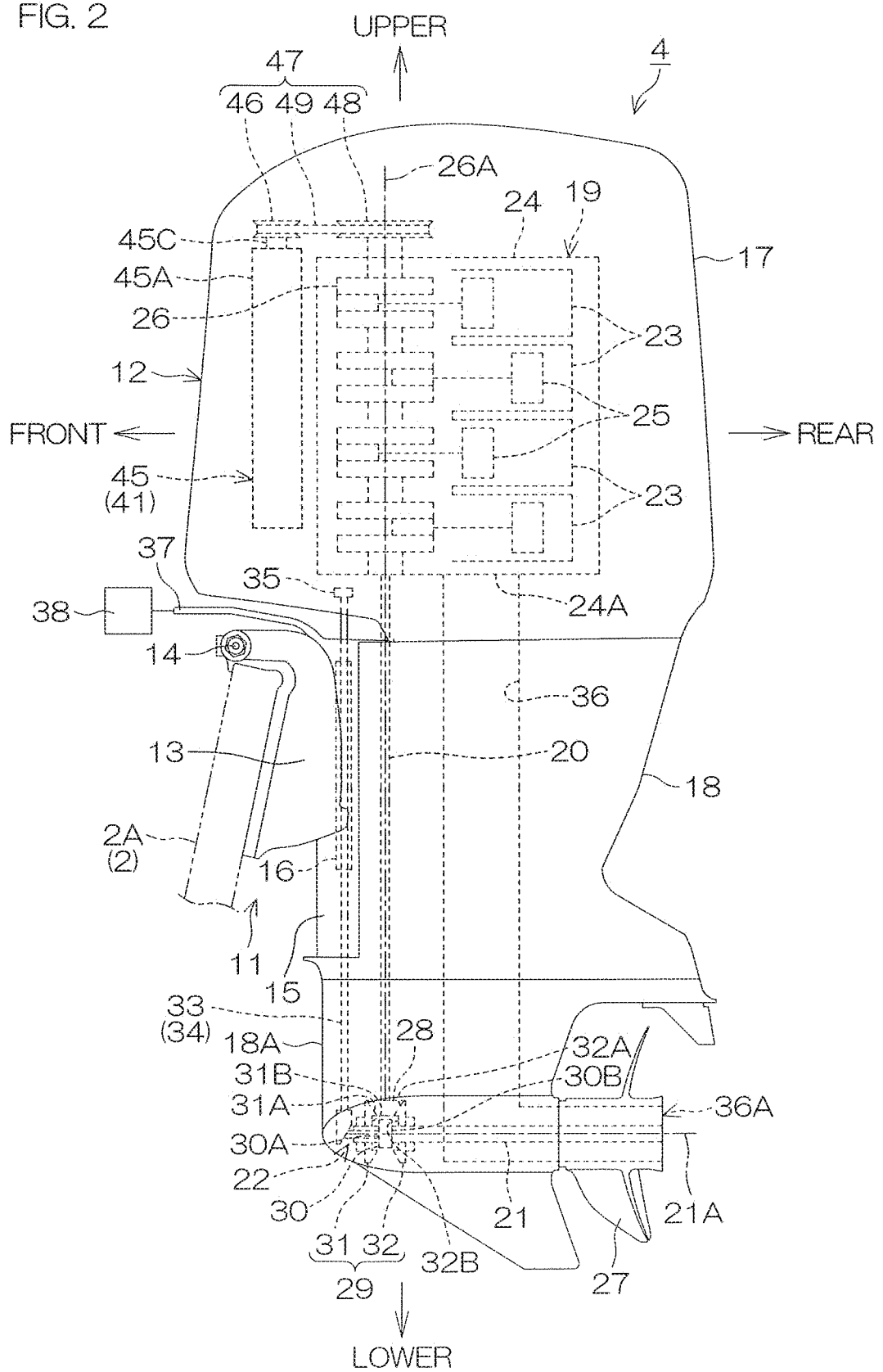
FIG. 2 is a schematic side view of an outboard motor included in the vessel.

FIG. 2 is a schematic right side view of the outboard motor 4. The leftward side in FIG. 2 is the front side of the outboard motor 4, and the rightward side in FIG. 2 is the rear side of the outboard motor 4. The upward side in FIG. 2 is the upper side of the outboard motor 4, and the downward side in FIG. 2 is a lower side of the outboard motor 4. An up-down direction is also a vertical direction. A direction perpendicular to the plane of paper of FIG. 2 is the left-right direction of the outboard motor 4. In the following description, whether the outboard motor 4 is in the leftward direction or the rightward direction is determined based on a direction given when the outboard motor 4 is seen from the front side. Therefore, the near side in a direction perpendicular to the plane of paper of FIG. 2 is the right side of the outboard motor 4, and the far side in the direction perpendicular to the plane of paper of FIG. 2 is the left side of the outboard motor 4.

The outboard motor 4 includes an attachment mechanism 11 used to attach the outboard motor 4 to the transom stern 2A and an outboard motor main body 12. The attachment mechanism 11 includes a clamp bracket 13 fixed to the transom stern 2A and a swivel bracket 15 coupled to the clamp bracket 13 through a tilt shaft 14 horizontally extending in the left-right direction. The swivel bracket 15 is coupled to the outboard motor main body 12 through a steering shaft 16 extending in the up-down direction. Thus, the outboard motor main body 12 is attached to the transom stern 2A by the attachment mechanism 11 in a substantially vertical attitude.

The outboard motor main body 12 and the swivel bracket 15 are turnable around the tilt shaft 14 in the up-down direction with respect to the clamp bracket 13. The outboard motor main body 12 is turned around the tilt shaft 14, and, as a result, the outboard motor main body 12 is tilted with respect to the hull 2 and with respect to the clamp bracket 13. The outboard motor main body 12 is turnable in the left-right direction together with the steering shaft 16 with respect to the clamp bracket 13 and with respect to the swivel bracket 15. When the outboard motor main body 12 turns in the left-right direction, the vessel 1 is steered.

The outboard motor main body 12 includes a box-shaped engine cover 17 and a hollow casing 18 extending downwardly from the engine cover 17. A lower end portion of the casing 18 defines a lower case 18A. The outboard motor main body 12 includes an engine 19 housed in the engine cover 17, a drive shaft 20 extending along the up-down direction in the casing 18, and a propeller shaft 21 and a first transmission 22 both of which are located in the lower case 18A.

The engine 19 is an internal combustion engine that combusts fuel, such as gasoline, and that generates power. The engine 19 includes a cylinder block 24 having a single or a plurality of cylinders 23, a piston 25 located in each cylinder 23, and a crankshaft 26 that extends along the up-down direction in the cylinder block 24 and that is coupled to the pistons 25. The engine 19 in the present preferred embodiment is a straight four-cylinder engine in which four cylinders 23 are located in series and spaced apart along the up-down direction. A portion, which houses the crankshaft 26, of the cylinder block 24 defines a crank case.

The crankshaft 26 has a crankshaft axis 26A extending in the up-down direction. A lower end portion of the crankshaft 26 is joined to an upper end portion of the drive shaft 20. An air-fuel mixture is combusted in the cylinder 23, and, as a result, the piston 25 rectilinearly reciprocates in the front-rear direction perpendicular to the crankshaft axis 26A. When the piston 25 rectilinearly reciprocates, the crankshaft 26 is driven and rotated around the crankshaft axis 26A along with the drive shaft 20.

The propeller shaft 21 extends in the horizontal direction along the front-rear direction in the lower case 18A. A lower end portion of the drive shaft 20 is coupled to a front end portion of the propeller shaft 21 by the first transmission 22. A rear end portion of the propeller shaft 21 projects rearwardly from the lower case 18A. A propeller 27 is joined to the rear end portion of the propeller shaft 21. The propeller shaft 21 rotates together with the propeller 27 around a rotational axis 21A extending in the front-rear direction.

The first transmission 22 is used to transmit the rotation of the drive shaft 20 to the propeller shaft 21. The first transmission 22 includes a driving gear 28 fixed to the lower end portion of the drive shaft 20 and a rotary body 29 and a dog clutch 30 both of which are attached to the front end portion of the propeller shaft 21. The driving gear 28 is a bevel gear. The propeller shaft 21 is located below the driving gear 28. The rotary body 29 includes a first rotary body 31 and a second rotary body 32 that are located side by side in the front-rear direction along the propeller shaft 21. The first rotary body 31 and the second rotary body 32 are, for example, cylindrical bevel gears, respectively.

In the present preferred embodiment, the first rotary body 31 is located at a more forward position than the driving gear 28, and the second rotary body 32 is located at a more rearward position than the driving gear 28, but the front-rear positional relationship between the first rotary body 31 and the second rotary body 32 may be opposite to that of the present preferred embodiment. In a rear surface of the first rotary body 31, a tooth portion 31A is provided at a tapered outer peripheral portion, and a claw portion 31B is provided at an inner peripheral portion. In a front surface of the second rotary body 32, a tooth portion 32A is provided at a tapered outer peripheral portion, and a claw portion 32B is provided at an inner peripheral portion.

The first rotary body 31 surrounds a portion, which is at a more forward position than the driving gear 28, of the front end portion of the propeller shaft 21, and the second rotary body 32 surrounds a portion, which is at a more rearward position than the driving gear 28, of the front end portion of the propeller shaft 21. The first rotary body 31 and the second rotary body 32 are located so that their tooth portions 31A and 32A face each other at a distance from each other in the front-rear direction, and the first rotary body 31 and the second rotary body 32 engage with the driving gear 28. When the driving gear 28 rotates together with the drive shaft 20 in response to the driving of the engine 19, the rotation of the driving gear 28 is transmitted to the first rotary body 31 and the second rotary body 32. Thus, the first rotary body 31 and the second rotary body 32 rotate around the rotational axis 21A of the propeller shaft 21 in mutually opposite directions.

The dog clutch 30 is located between the first rotary body 31 and the second rotary body 32. The dog clutch 30 is, for example, cylindrical, and surrounds the front end portion of the propeller shaft 21. A first claw portion 30A is provided at a front end surface of the dog clutch 30, and a second claw portion 30B is provided at a rear end surface of the dog clutch 30. The dog clutch 30 is coupled to the front end portion of the propeller shaft 21 by, for example, a spline. Therefore, the dog clutch 30 rotates together with the front end portion of the propeller shaft 21. Additionally, the dog clutch 30 is movable in the front-rear direction with respect to the front end portion of the propeller shaft 21. In other words, the dog clutch 30 is rotatable together with the propeller shaft 21, and is relatively movable in the front-rear direction with respect to the propeller shaft 21.

The first transmission 22 also includes a shift mechanism 33 located at a more forward position than the propeller shaft 21 in the lower case 18A. The shift mechanism 33 includes, for example, a shift rod 34 extending in the up-down direction and an electric shift actuator 35 joined to the shift rod 34. A lower end portion of the shift rod 34 is coupled to the dog clutch 30. When the shift actuator 35 is operated by the control of the ECU 8 (see FIG. 1), the shift rod 34 turns around an axis of the shift rod 34. The shift rod 34 turns, and, as a result, the dog clutch 30 is moved along the front-rear direction between a disconnection position and a connection position.

The disconnection position is a position in which the dog clutch 30 is disconnected from the first rotary body 31 and the second rotary body 32 and engages with neither of the rotary bodies 29 as shown in FIG. 2. In a state in which the dog clutch 30 is located in the disconnection position, each rotary body 29 to which the rotation of the drive shaft 20 is transmitted runs idle, and therefore the rotation of the drive shaft 20 is not transmitted to the propeller shaft 21. The shift position of the outboard motor 4 at this time is hereinafter referred to as "neutral."

The connection position is a position in which the dog clutch 30 engages with either one of the first rotary body 31 and the second rotary body 32. The connection position includes a first connection position in which the first claw portion 30A of the dog clutch 30 engages with only the claw portion 31B of the first rotary body 31 and a second connection position in which the second claw portion 30B of the dog clutch 30 engages with only the claw portion 32B of the second rotary body 32. The disconnection position is a position between the first connection position and the second connection position. The first connection position is more forward than the disconnection position, and the second connection position is more rearward than the disconnection position.

In a state in which the dog clutch 30 is located in the first connection position and is coupled to only the first rotary body 31, the rotation of the first rotary body 31 is transmitted to the propeller shaft 21, and therefore the shift position of the outboard motor 4 is shifted into "forward." Thereupon, the rotation of the drive shaft 20 is transmitted to the propeller shaft 21 through the first rotary body 31 and through the dog clutch 30, and, as a result, the propeller 27 rotates in a forward rotational direction (for example, in a clockwise direction when seen from the rear side). Thus, the propeller 27 is driven by the engine 19, and a forward thrust is generated.

In a state in which the dog clutch 30 is located in the second connection position and is coupled to only the second rotary body 32, the rotation of the second rotary body 32 is transmitted to the propeller shaft 21, and therefore the shift position of the outboard motor 4 is shifted into "reverse." Thereupon, the rotation of the drive shaft 20 is transmitted to the propeller shaft 21 through the second rotary body 32 and through the dog clutch 30, and, as a result, the propeller 27 rotates in a reverse rotational direction opposite to the forward rotational direction. Thus, the propeller 27 is driven by the engine 19, and a reverse thrust is generated. Thus, in the present preferred embodiment, the first rotary body 31 is a gear for a forward movement, and the second rotary body 32 is a gear for a reverse movement. Of course, the first rotary body 31 may be a gear for a reverse movement, and the second rotary body 32 may be a gear for a forward movement.

The outboard motor main body 12 includes an exhaust passage 36 that is provided inside the outboard motor main body 12 and that is connected to the engine 19. The exhaust passage 36 includes an exhaust port 36A provided at a rear end surface of the propeller 27. In a state in which the vessel 1 floats on water and in which the propeller 27 is located below a water surface, the exhaust port 36A is located in water, and therefore water that has passed through the exhaust port 36A enters a downstream portion of the exhaust passage 36. On the other hand, when the engine 19 rotates at a high speed, water in the exhaust passage 36 is pushed by the pressure of an exhaust gas emitted from the engine 19, and is discharged from the exhaust port 36A together with the exhaust gas. Thus, the exhaust gas generated in the engine 19 is discharged into the water.

A steering rod 37 that forwardly extends is fixed to the outboard motor main body 12. An electric steering actuator 38 that is controlled by the ECU 8 is joined to the steering rod 37. The outboard motor main body 12 is able to turn around the steering shaft 16 by operating the steering actuator 38, thus making it possible to perform steering.

Figure 3:
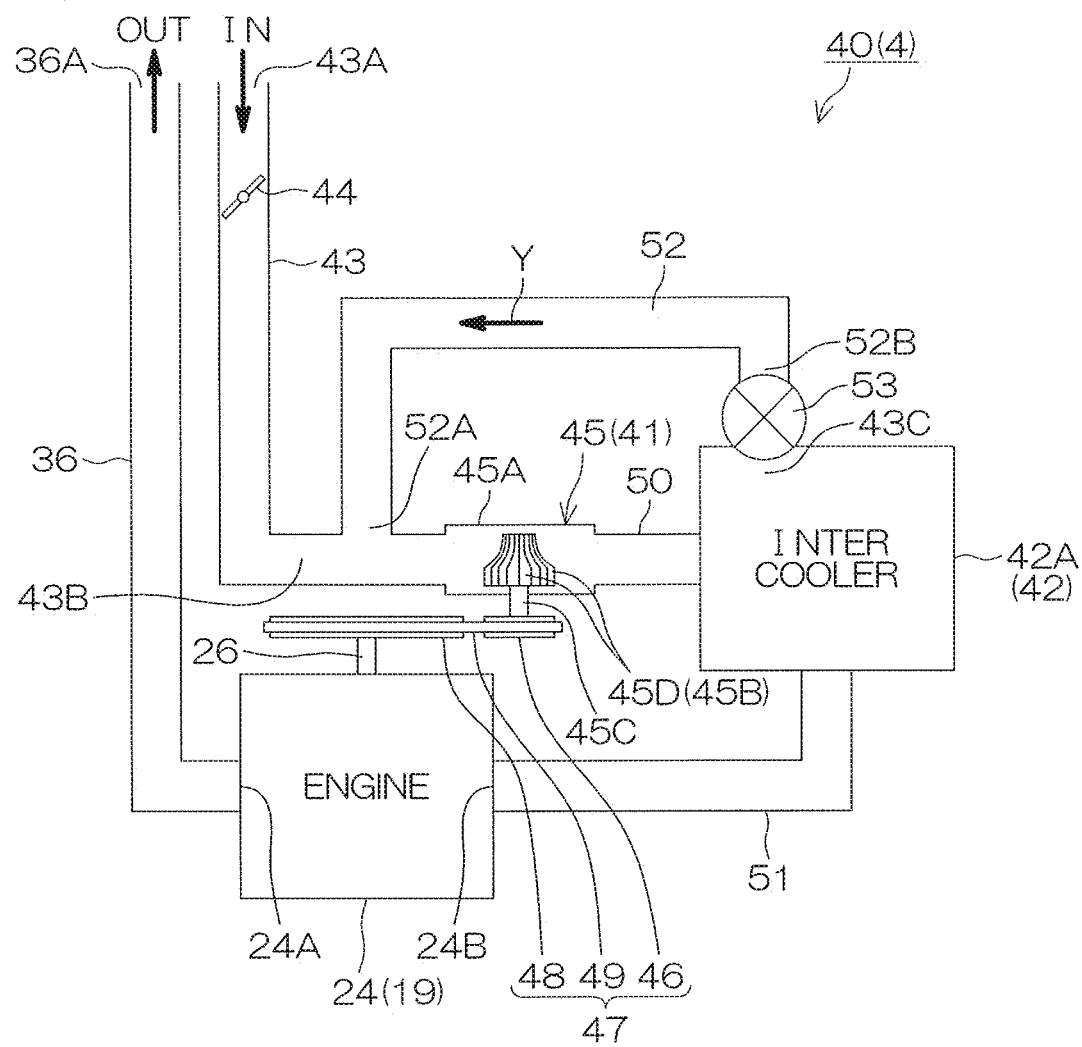
FIG. 3 is a schematic view shown to describe an air intake/exhaust system of the outboard motor.

FIG. 3 is a schematic view shown to describe an air intake/exhaust system 40 of the outboard motor 4. The air intake/exhaust system 40 includes an engine 19, a pressure charging device 41 that compresses and supplies air to the cylinder block 24 of the engine 19, and an intercooler 42 that cools air compressed by the pressure charging device 41.

The engine 19 includes the cylinder block 24 and the exhaust passage 36 both of which have been mentioned above, an air intake passage 43, and an electric throttle valve 44 located in the air intake passage 43. The exhaust passage 36 is connected to an exhaust port 24A provided in the cylinder block 24, and the air intake passage 43 is connected to an intake port 24B provided in the cylinder block 24. If the exhaust port 24A or the intake port 24B is provided in a cylinder head (not shown) of the engine 19, the cylinder head may be regarded as a portion of the cylinder block 24. An air inlet 43A is provided in an end portion, which is opposite to the intake port 24B, of the air intake passage 43. The opening degree of the throttle valve 44 is adjusted by causing the ECU 8 to control a throttle valve 44.

The pressure charging device 41 is interposed in the air intake passage 43. An example of the pressure charging device 41 includes a supercharger 45 driven by the rotation of the crankshaft 26 of the engine 19. The supercharger 45 includes a housing 45A having an internal space forming a portion of the air intake passage 43, a compressor wheel 45B located in the housing 45A, and a rotational shaft 45C coaxially fixed to the compressor wheel 45B. The compressor wheel 45B includes a plurality of blades 45D radially located around the rotational shaft 45C. An end portion, which is spaced away from the compressor wheel 45B, of the rotational shaft 45C is located outside the housing 45A. A pulley 46 is coaxially fixed to the end portion.

The air intake/exhaust system 40 includes a second transmission 47 by which the crankshaft 26 and the supercharger 45 are joined together. An example of the second transmission 47 includes the pulley 46 mentioned above, another pulley 48 fixed to the crankshaft 26, and a belt 49 by which the pulley 46 and the pulley 48 are connected together. In this example, while the crankshaft 26 is rotating, the rotation of the crankshaft 26 is transmitted to the pulley 46 through the pulley 48 and through the belt 49, and the compressor wheel 45B and the rotational shaft 45C continue rotating, and, as a result, the supercharger 45 always operates. Sprockets may be used instead of the pulley 46 and the pulley 48, respectively, and a chain may be used instead of the belt 49. When the supercharger 45 operates in a state in which the throttle valve 44 has been opened, air that is taken in from the air inlet 43A and then flows through the air intake passage 43 is compressed by the compressor wheel 45B rotating in the housing 45A.

The intercooler 42 is interposed between the cylinder block 24 and the supercharger 45 in the air intake passage 43. The intercooler 42 includes a housing 42A having an internal space defining a portion of the air intake passage 43 and a cooling fin (not shown). Either an air-cooled-type cooler or a water-cooled type cooler may be used as the intercooler 42. The air intake passage 43 includes a hose 50 that connects the housing 42A and the housing 45A of the supercharger 45 together and an intake manifold 51 that extends from the housing 42A and that is connected to the cylinder block 24.

Air compressed by the compressor wheel 45B in the housing 45A of the supercharger 45 is guided to the intercooler 42 while flowing through the inside of the hose 50, and is cooled by heat exchange with the cooling fin in the housing 42A of the intercooler 42. The cooled air flows through the intake manifold 51, then becomes an air-fuel mixture, and is then supplied from the intake port 24B of the cylinder block 24 into the cylinder 23, and is combusted therein. An exhaust gas generated by combustion flows from the exhaust port 24A through the exhaust passage 36, and is then discharged from the exhaust port 36A into the water as described above.

In the following description, a region, which is on the upstream side closer to the air inlet 43A than the supercharger 45, of the air intake passage 43 is referred to as an "upstream region 43B," and a region, which is on the downstream side farther from the air inlet 43A than the supercharger 45, of the air intake passage 43 is referred to as a "downstream region 43C." A portion, which is at a more upstream location than the compressor wheel 45B, of the internal space of the housing 45A of the supercharger 45 may be regarded as the upstream region 43B. The internal space of the hose 50 and of the housing 42A of the intercooler 42 is the downstream region 43C. A portion, which is at a more downstream location than the compressor wheel 45B, of the internal space of the housing 45A of the supercharger 45 may be likewise regarded as the downstream region 43C.

The air intake/exhaust system 40 includes a bypass passage 52 that defines an air passage bypassing the supercharger 45 and an air bypass valve 53 that opens and closes the bypass passage 52. The bypass passage 52 includes a first end 52A connected to the upstream region 43B of the air intake passage 43 and a second end 52B connected to the downstream region 43C of the air intake passage 43. In the present preferred embodiment, the second end 52B is connected to the housing 42A of the intercooler 42.

The air bypass valve 53 may be provided in the same way as the throttle valve 44. The opening degree of the air bypass valve 53 is adjusted by causing the ECU 8 to control the air bypass valve 53. The air bypass valve 53 in a standby state is closed. When the air bypass valve 53 is opened while the supercharger 45 is operating, the bypass passage 52 functions as a return passage, and thus returns a portion of the air guided to the intercooler 42 to the upstream region 43B.

Figure 4:
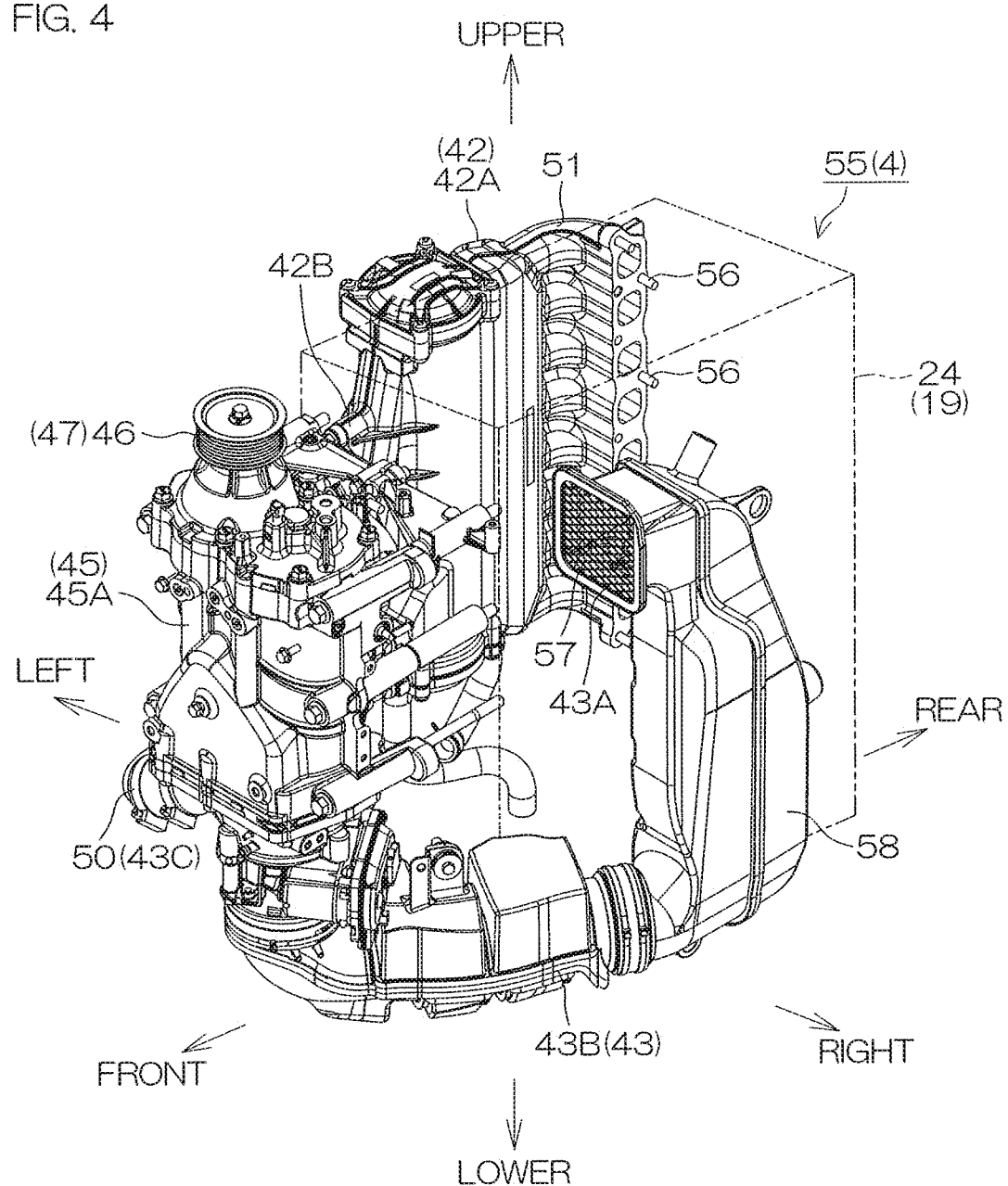
FIG. 4 is a perspective view of an air intake device in the air intake/exhaust system.

Components other than the exhaust passage 36 in the air intake/exhaust system 40 include an air intake device 55 in the outboard motor 4. FIG. 4 is a perspective view of the air intake device 55 seen from the right front side. The intercooler 42 is located laterally of (more specifically, on the leftward side of) the cylinder block 24 of the engine 19. The housing 42A of the intercooler 42 is made of metal, such as aluminum, and is a hollow body that is elongated in the up-down direction. The intake manifold 51 is integral with the housing 42A, and extends rearwardly from the housing 42A and is bent rightward, and is fixed to the cylinder block 24 by a bolt 56, for example.

The supercharger 45 is located in front of the cylinder block 24. The upstream region 43B of the air intake passage 43 extends downwardly from the housing 45A of the supercharger 45, and then extends right-rearwardly, and is then bent on the right side of the cylinder block 24, and extends upwardly. The air inlet 43A is provided at an upper end portion of the upstream region 43B in a state of being forwardly directed. A filter 57 made of a mesh, etc., is provided at the air inlet 43A. A portion, which is located on the right side of the cylinder block 24, of the upstream region 43B may be referred to as an air intake duct 58. The pulley 46 mentioned above is located at an upper surface of the housing 45A of the supercharger 45.

Figure 5:
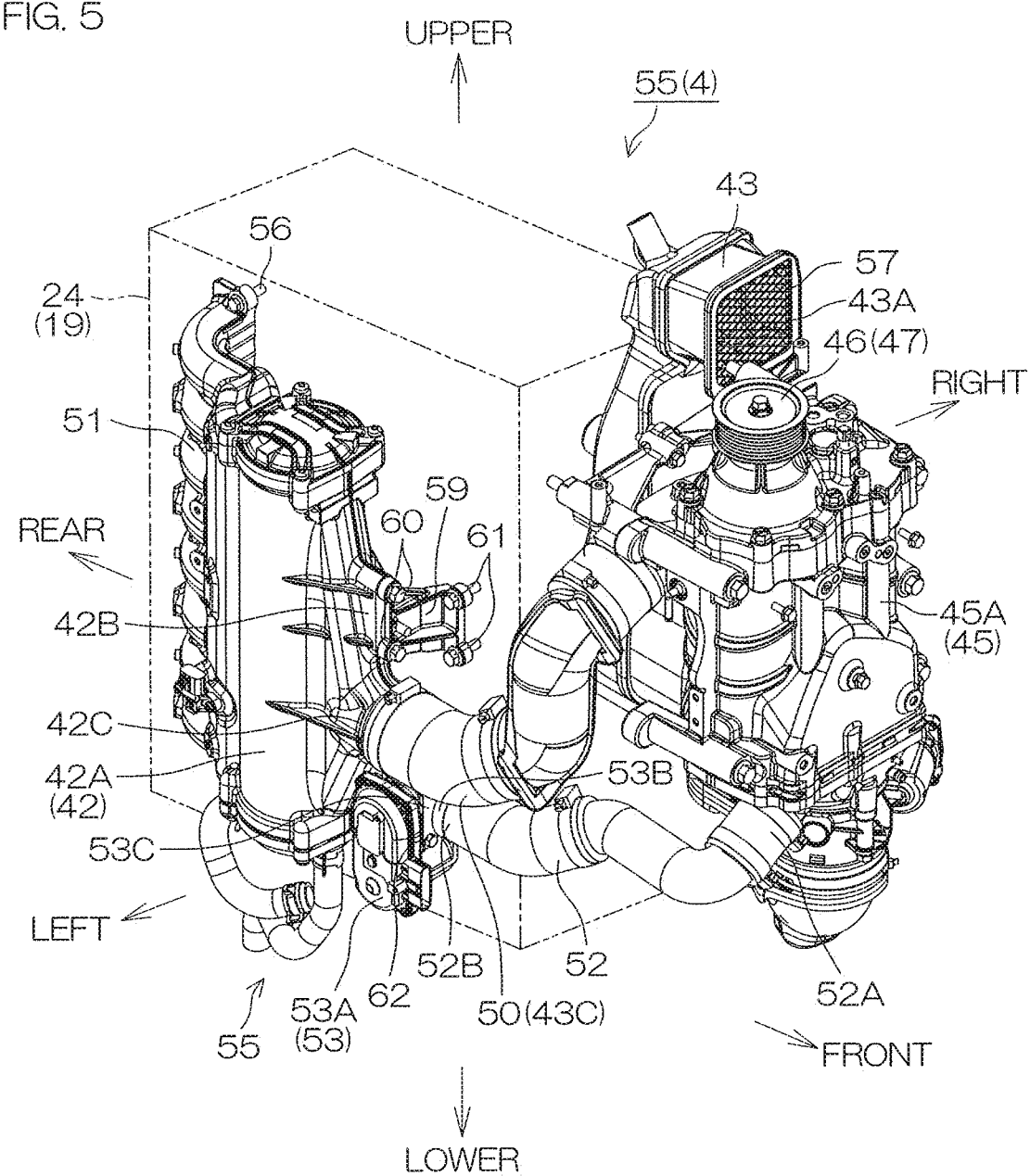
FIG. 5 is a perspective view of the air intake device seen from another direction.

FIG. 5 is a perspective view of the air intake device 55 seen from the left front side. A left end portion of a bracket 59 is fixed by a bolt 60 to a halfway portion in the up-down direction in a front end portion of the housing 42A of the intercooler 42. A right end portion of the bracket 59 is fixed by another bolt 61 to the cylinder block 24 of the engine 19, and therefore the housing 42A is fixed to the cylinder block 24 through the bracket 59.

The air bypass valve 53 is located on the same side as the intercooler 42 with respect to the cylinder block 24 of the engine 19, i.e., is located on the leftward side of the cylinder block 24. The air bypass valve 53 is located in front of a lower portion of the housing 42A of the intercooler 42. A plurality of harnesses (not shown), etc., are located as a group in a space below the air bypass valve 53. The hose 50, which is a portion of the downstream region 43C of the air intake passage 43, extends forwardly from a portion, which is above the air bypass valve 53 and below the bracket 59, of the front end portion of the housing 42A. The hose 50 is bent several times halfway, and is drawn out to the forward side of the cylinder block 24, and is connected to an upper portion of the housing 45A of the supercharger 45 from the left side. The bypass passage 52 extends forwardly from the air bypass valve 53, and is bent several times halfway, and is drawn out to the forward side of the cylinder block 24, and is connected to a lower portion of the housing 45A from the left side.

Figure 6:
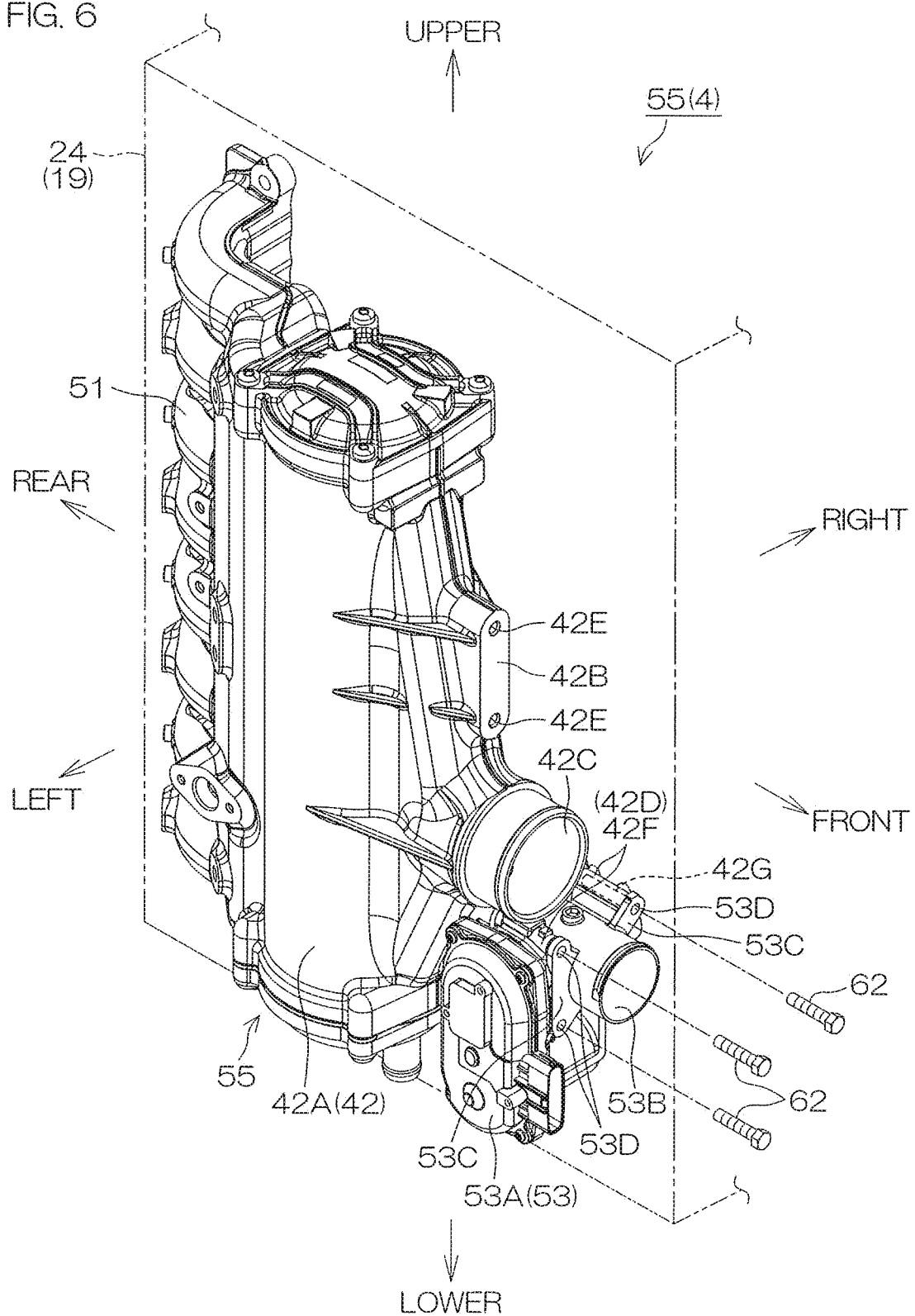
FIG. 6 is an enlarged view in which a main portion has been extracted from the device of FIG. 5.

FIG. 6 is an enlarged view in which a main portion has been extracted from FIG. 5. A fixing portion 42B to which the bracket 59 (see FIG. 5) is fixed, a coupling portion 42C to which the hose 50 is coupled, and a connection portion 42D that is a portion to which the air bypass valve 53 is connected are provided in this order from above at the front end portion of the housing 42A of the intercooler 42. A front end surface of the fixing portion 42B is flat along the up-down direction, and a female screw 42E to which the aforementioned bolt 60 (see FIG. 5) is fastened one by one is provided at each of the upper and lower end portions of the front end surface of the fixing portion 42B. The coupling portion 42C has a circular cylindrical shape that projects forwardly. The connection portion 42D includes four pillar-shaped fastening portions 42F that forwardly project in a formation of, for example, two columns and two rows. A female screw 42G that extends rearwardly from a front end surface of the fastening portion 42F is provided at each of the fastening portions 42F one by one. The number of female screws 42G provided here is four in total, for example.

The air bypass valve 53 includes a housing 53A that houses a valve body (not shown). A cylinder portion 53B that has a circular cylindrical shape and that extends in the front-rear direction is provided at the housing 53A as its right side. A single or a plurality of flanges 53C projecting from an outer peripheral surface of the cylinder portion 53B is/are provided between both ends of the cylinder portion 53B in the front-rear direction. An insertion hole 53D passing through the flange 53C in the front-rear direction is provided in the flange 53C. The number of insertion holes 53D provided here corresponds to the number of female screws 42G of the connection portion 42D of the housing 42A of the intercooler 42 (in other words, is equal to the number of female screws 42G), and the insertion holes 53D are located so as to be dispersed in four directions when seen from the front.

A portion, which is at a more rearward position than the flange 53C, of the cylinder portion 53B of the air bypass valve 53 is surrounded by the four pillar-shaped fastening portions 42F in the connection portion 42D. The flange 53C of the cylinder portion 53B faces any one of the fastening portions 42F from the front side. Each of the insertion holes 53D provided in the flange 53C matches the female screw 42G one by one. A bolt 62 is inserted into each of the insertion holes 53D being in this state one by one, and is fastened to a corresponding one of the female screws 42G. Thus, the air bypass valve 53 is attached directly to the connection portion 42D, i.e., to the intercooler 42.

Figure 7:
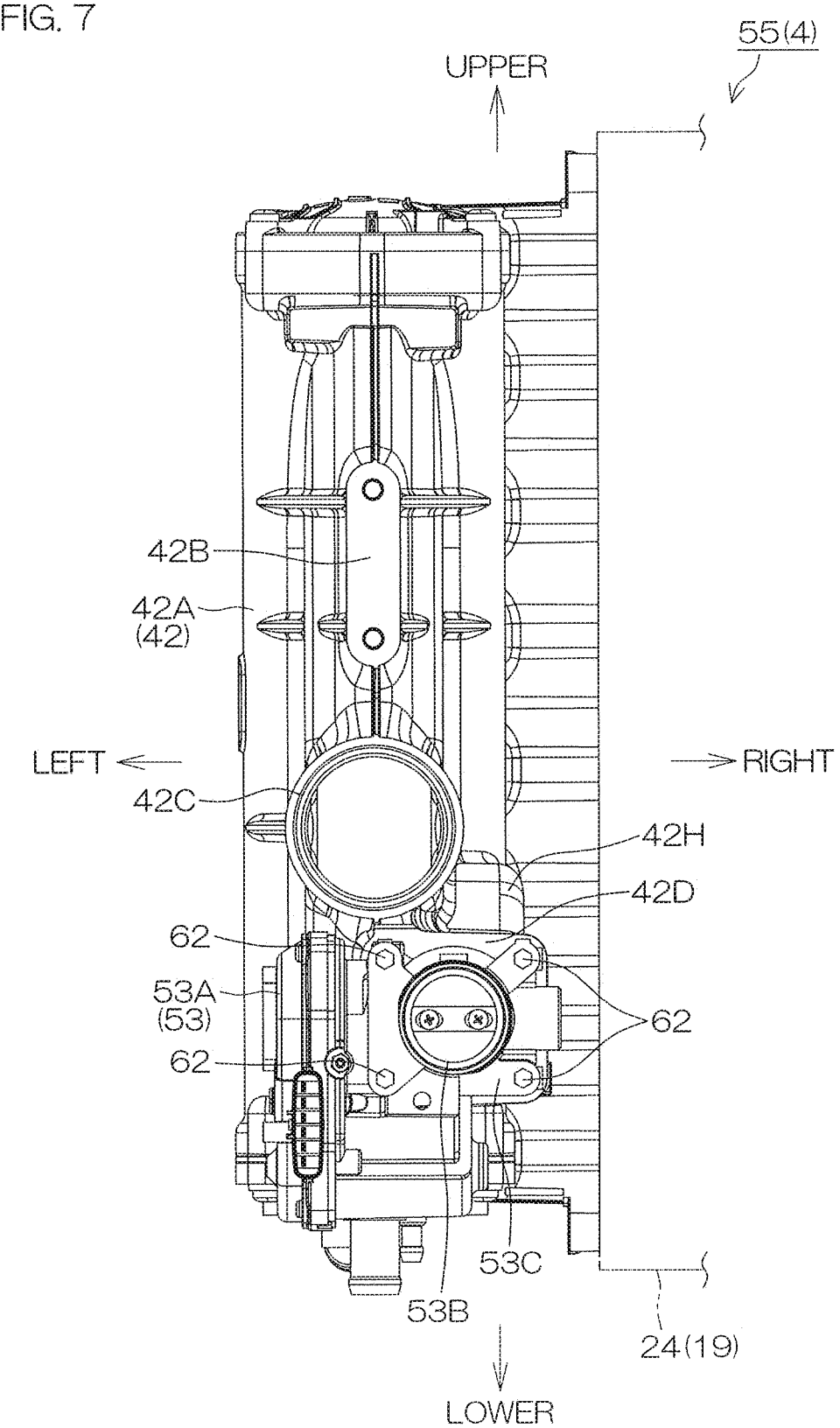
FIG. 7 is a front view of the main portion in the outboard motor.
Figure 8:
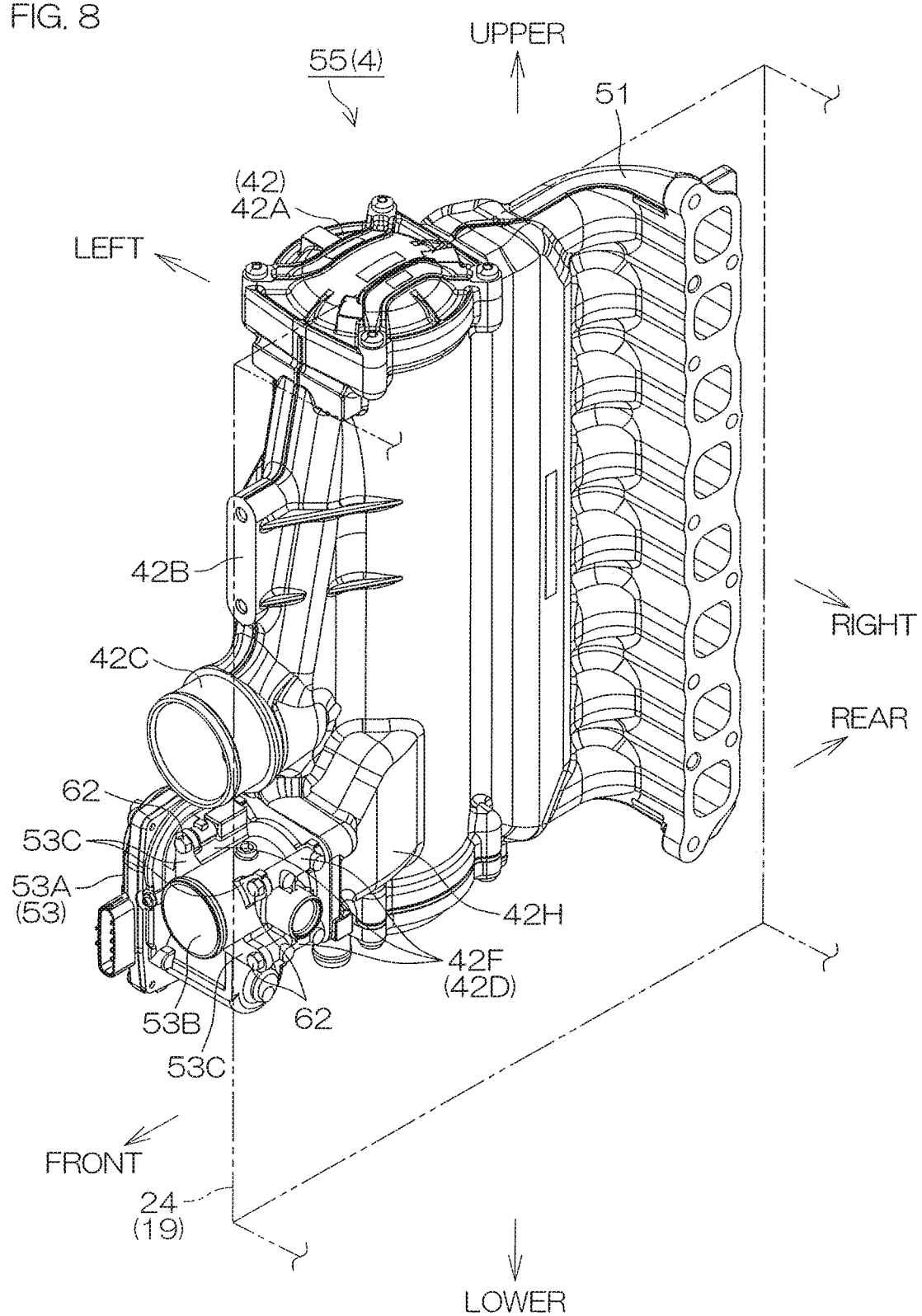
FIG. 8 is an enlarged view in which the main portion has been extracted from the device of FIG. 4.

The bypass passage 52 (see FIG. 5) is connected to a portion, which is at a more forward position than the flange 53C, of the cylinder portion 53B of the air bypass valve 53. The internal space of the cylinder portion 53B communicates with the internal space of the housing 42A of the intercooler 42. The internal space of the cylinder portion 53B may be regarded as a portion of the bypass passage 52, or may be regarded as a portion of the internal space of the housing 42A. The cylinder portion 53B is located at a more rightward position than the coupling portion 42C to which the hose 50 is coupled in the housing 42A (see also FIG. 7). In accordance with this, a projection portion 42H that projects rightward, i.e., that projects toward the cylinder block 24 is provided at the connection portion 42D to which the cylinder portion 53B is connected in the housing 42A (see FIG. 8). The intercooler 42 is reinforced by the projection portion 42H. The projection portion 42H is a hollow body, and its internal space defines a portion of the internal space of the housing 42A.

As described above, according to a preferred embodiment of the present invention, air that has been taken into the air intake passage 43 connected to the cylinder block 24 of the engine 19 is compressed by the supercharger 45 that is an example of the pressure charging device 41. The compressed air is cooled by the intercooler 42, and is then used for combustion in each of the cylinders 23 of the cylinder block 24.

When the air bypass valve 53 is opened, a portion of the air supplied to the downstream region 43C of the air intake passage 43 flows through the bypass passage 52, and bypasses the supercharger 45, and thus returns to the upstream region 43B of the air intake passage 43 (see arrow Y of FIG. 3). This makes it possible to adjust the pressure in the downstream region 43C, i.e., to adjust the charging pressure by the opening degree of the air bypass valve 53. Additionally, if there is no need to compress and supply air to the cylinder block 24, a difference between the pressure of the downstream region 43C and the pressure of the upstream region 43B is reduced by opening the air bypass valve 53, and therefore it is possible to lessen a burden imposed on the pressure charging device 41.

The outboard motor 4 has a novel structure in which the air bypass valve 53 is attached directly to the intercooler 42, especially relative to the pressure charging device 41. Therefore, additional components, such as a bracket by which the air bypass valve 53 is fixed to the cylinder block 24, become needless, and therefore it is possible to reduce the number of components and weight, thus making it possible to make the outboard motor 4 compact. Additionally, the air bypass valve 53 is directly attached not to the cylinder block 24 of the engine 19 but to the intercooler 42, and therefore it is possible to significantly reduce vibrations of the air bypass valve 53 caused by the transmission of vibrations of the engine 19 to the air bypass valve 53.

In a preferred embodiment of the present invention, the second end 52B of the bypass passage 52 is connected to the intercooler 42, and the bypass passage 52 is a return passage that returns a portion of the air guided to the intercooler 42 to a more upstream location than the position of the pressure charging device 41.

With this arrangement, when the air bypass valve 53 is opened, it is possible to return a portion of the air guided to the intercooler 42 in the air supplied to the downstream region 43C to the upstream region 43B by the bypass passage 52. If air guided to the intercooler 42 is air cooled by the intercooler 42, air that has become a comparatively low temperature by being cooled is able to flow through the bypass passage 52, and therefore the air bypass valve 53 and the bypass passage 52 are not required to have high heat-resisting properties, and low-cost components are able to be used. It is possible to use an arrangement in which air that has not yet been cooled in the air guided to the intercooler 42 is returned to the upstream region 43B by the bypass passage 52.

In a preferred embodiment of the present invention, the intercooler 42 includes the housing 42A provided with the female screw 42G (see FIG. 6). The insertion hole 53D is provided in the air bypass valve 53. The bolt 62 inserted in the insertion hole 53D is fastened to the female screw 42G, and, as a result, the air bypass valve 53 is directly attached to the intercooler 42.

This arrangement enables an operator who assembles the outboard motor 4 to easily attach the air bypass valve 53 directly to the intercooler 42 by inserting the bolt 62 into the insertion hole 53D and then fastening the bolt 62 to the female screw 42G. Another example may be used in which a screw shaft (not shown) provided instead of the female screw 42G is inserted into the insertion hole 53D, and then a nut (not shown) is fastened to this screw shaft, and, as a result, the air bypass valve 53 is directly attached to the intercooler 42.

In a preferred embodiment of the present invention, the intercooler 42 is located laterally of the cylinder block 24. The projection portion 42H (see FIG. 8) that projects toward the cylinder block 24 and that reinforces the intercooler 42 is provided at the connection portion 42D to which the air bypass valve 53 is connected in the housing 42A of the intercooler 42. This arrangement makes it possible to improve the rigidity of the intercooler 42.

In a preferred embodiment of the present invention, when the pressure charging device 41 includes the supercharger 45, the outboard motor 4 includes the second transmission 47 that joins the crankshaft 26 and the supercharger 45 together (see FIG. 3). Thus, the supercharger 45 always operates while the crankshaft 26 is rotating.

With this arrangement, in a situation in which the supercharger 45 operating in accordance with the rotation of the crankshaft 26 is not required to compress air and to supply compressed air to the engine 19, a difference between the pressure of the downstream region 43C and the pressure of the upstream region 43B becomes small as described above when the air bypass valve 53 is opened. Therefore, it is possible to lessen a burden imposed on the supercharger 45.

The pressure charging device 41 includes only the supercharger 45 in a preferred embodiment of the present invention, and yet the pressure charging device 41 may be configured as in a first preferred modification and a second preferred modification described below. With respect to the first and second preferred modifications, the same reference number is given to a component that is functionally equivalent to each component described above, and a detailed description of this component is omitted.

Figure 9:
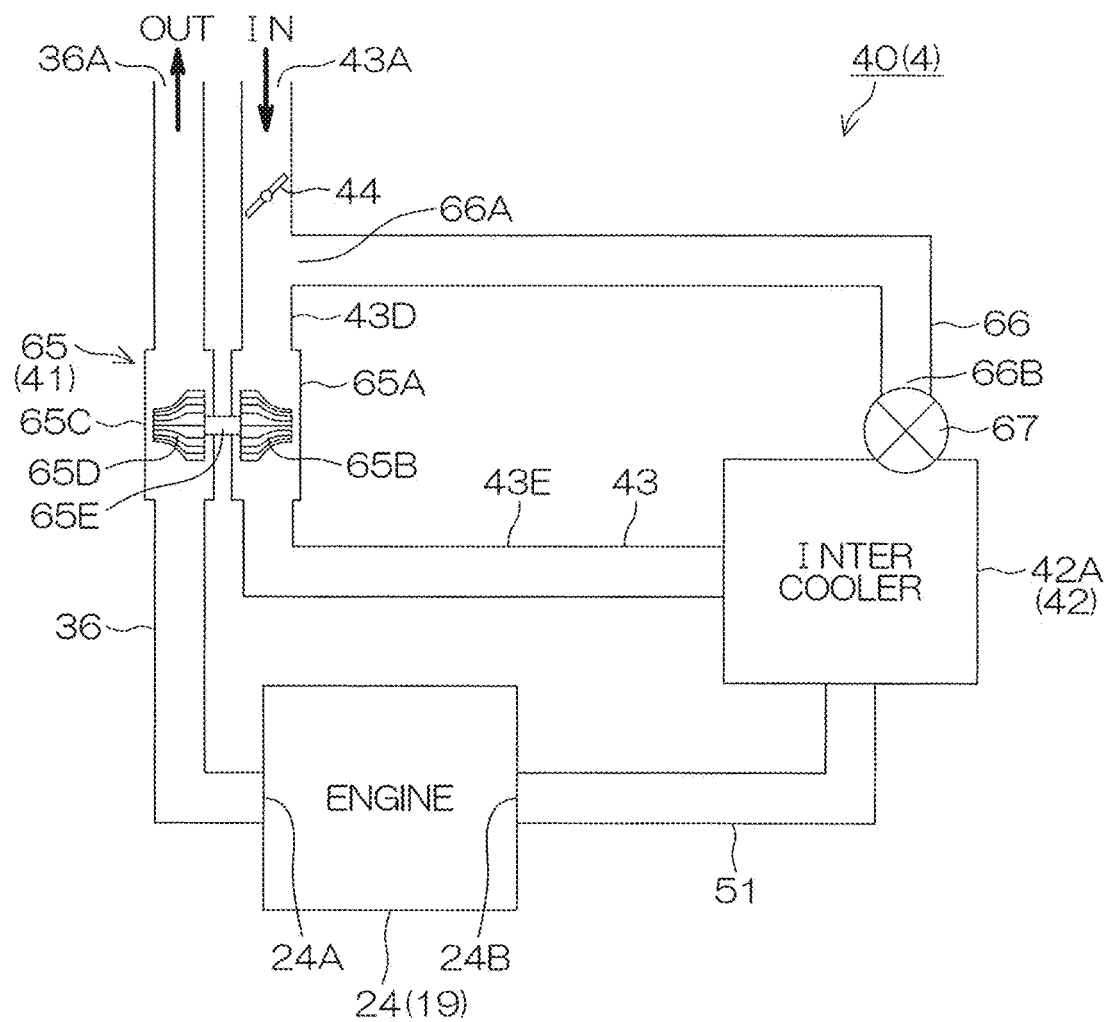
FIG. 9 is a schematic view shown to describe an air intake/exhaust system according to a preferred first modification.

FIG. 9 is a schematic view showing an air intake/exhaust system 40 according to a first preferred modification. The pressure charging device 41 according to the first preferred modification includes only a turbocharger 65 driven by an exhaust gas flowing through the exhaust passage 36. The turbocharger 65 includes a housing 65A having an internal space forming a portion of the air intake passage 43 and a compressor wheel 65B located in the housing 65A. The turbocharger 65 includes a housing 65C having an internal space defining a portion of the exhaust passage 36 and a turbine wheel 65D located in the housing 65C. The compressor wheel 65B and the turbine wheel 65D are each configured in the same way as the compressor wheel 45B (see FIG. 3) of the supercharger 45.

The compressor wheel 65B and the turbine wheel 65D are coaxially fixed by a coupling shaft 65E, and are rotatable together with each other. Therefore, when an exhaust gas flowing through the exhaust passage 36 rotates the turbine wheel 65D, the compressor wheel 65B also rotates, and thus the turbocharger 65 operates. When the turbocharger 65 operates in a state in which the throttle valve 44 has been opened, air, which has been taken from the air inlet 43A and which is flowing through the air intake passage 43, is compressed by the compressor wheel 65B rotating in the housing 65A. Air compressed by the compressor wheel 65B is allowed to continuously flow through the air intake passage 43, and is then guided to the intercooler 42, and is cooled by the intercooler 42.

A region, which is on the upstream side closer to the air inlet 43A than the turbocharger 65, of the air intake passage 43 is referred to as an "upstream region 43D," and a region, which is on the downstream side farther from the air inlet 43A than the turbocharger 65, of the air intake passage 43 is referred to as a "downstream region 43E." A portion, which is at a more upstream location than the compressor wheel 65B, of the internal space of the housing 65A of the turbocharger 65 may be regarded as the upstream region 43D. A portion, which is at a more downstream location than the compressor wheel 65B, of the internal space of the housing 65A may be likewise regarded as the downstream region 43E.

The air intake/exhaust system 40 includes a bypass passage 66 that defines an air passage bypassing the turbocharger 65 and an air bypass valve 67 that opens and closes the bypass passage 66. The bypass passage 66 includes a first end 66A connected to the upstream region 43D of the air intake passage 43 and a second end 66B connected to the downstream region 43E of the air intake passage 43. The second end 66B may be connected to the housing 42A of the intercooler 42. The air bypass valve 67 is provided in the same way as the air bypass valve 53 described above. Therefore, the air bypass valve 67 is directly attached to the intercooler 42.

The opening degree of the air bypass valve 67 is adjusted by causing the ECU 8 to control the air bypass valve 67. The air bypass valve 67 in a standby state is closed. When the air bypass valve 67 is opened while the turbocharger 65 is operating, the bypass passage 66 functions as a return passage, and thus returns a portion of the air guided to the intercooler 42 to the upstream region 43D.

Figure 10:
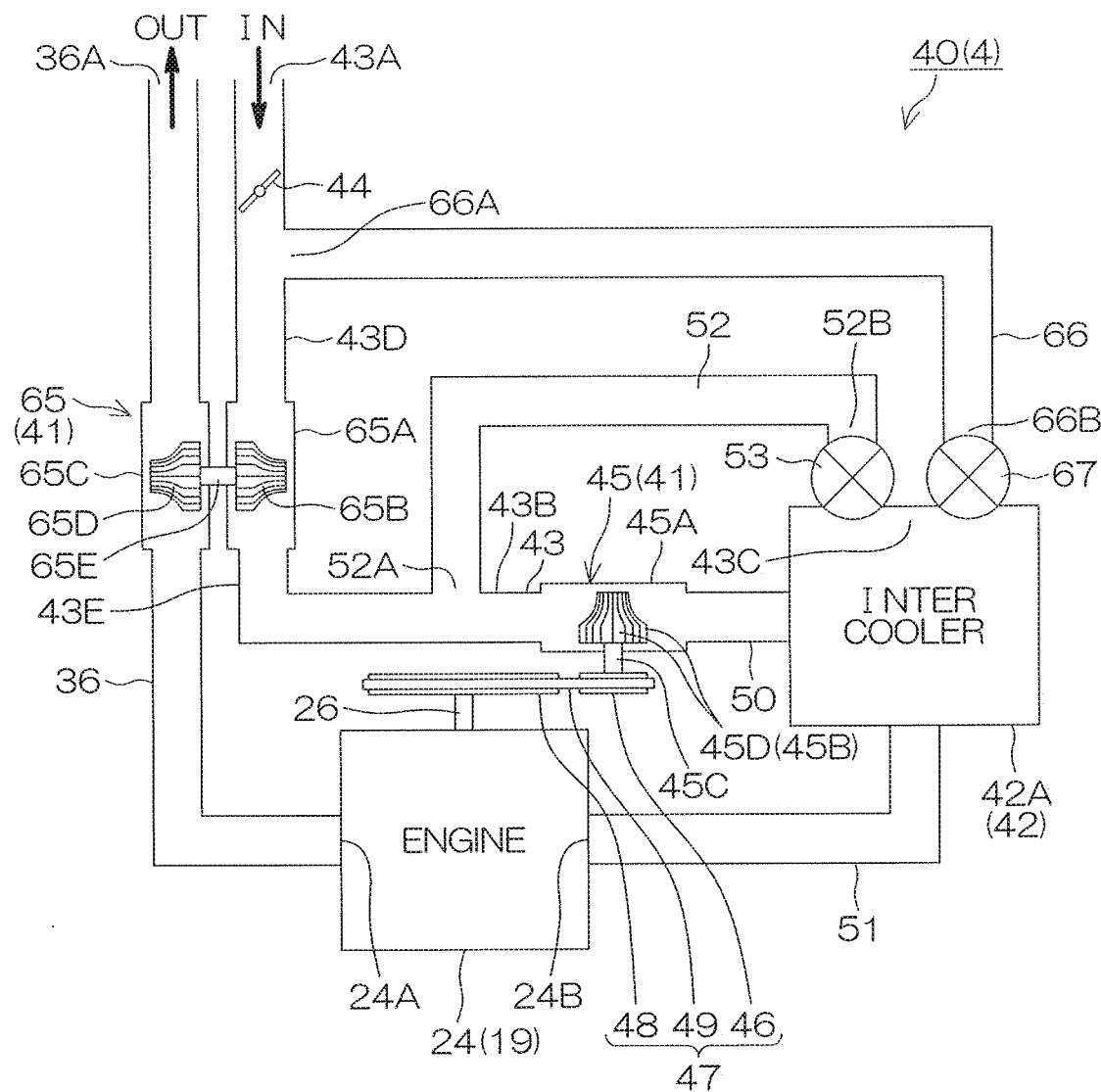
FIG. 10 is a schematic view shown to describe an air intake/exhaust system according to a preferred second modification.

FIG. 10 is a schematic view shown to describe an air intake/exhaust system 40 according to a second preferred modification. As in the second preferred modification, the pressure charging device 41 may be a twin charger including both the supercharger 45 and the turbocharger 65.

For example, another arrangement, such as a Lysholm compressor, may be used as the supercharger 45 without being limited to the centrifugal type supercharger shown in FIG. 3, etc.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An outboard motor comprising:
   an engine including a cylinder block, an air intake passage connected to the cylinder block, an exhaust passage connected to the cylinder block, and a crankshaft extending along a vertical direction in the cylinder block;
   a propeller to be driven by the engine;
   a drive shaft joined to the crankshaft and extending along the vertical direction;
   a propeller shaft extending in a horizontal direction and joined to the propeller;
   a first transmission to transmit rotation of the drive shaft to the propeller shaft;
   a pressure charger in the air intake passage to compress air flowing through the air intake passage;
   an intercooler in the air intake passage between the cylinder block and the pressure charger to cool air compressed by the pressure charger;
   a bypass air passage that bypasses the pressure charger and includes a first end connected to a region of the air intake passage located upstream of the pressure charger and a second end connected to a region of the air intake passage located downstream of the pressure charger; and
   an air bypass valve directly attached to the intercooler to open and close the bypass air passage.

2. The outboard motor according to claim 1, wherein the second end of the bypass air passage is connected to the intercooler, and the bypass air passage includes a return passage to return a portion of air guided to the intercooler to a region of the air intake passage located upstream of the pressure charger.

3. The outboard motor according to claim 1, wherein
   the intercooler includes a housing provided with a female screw;
   the air bypass valve includes an insertion hole; and
   the air bypass valve is directly attached to the intercooler by a bolt inserted through the insertion hole and into the female screw.

4. The outboard motor according to claim 3, wherein
   the intercooler is located laterally of the cylinder block; and a projection projecting toward the cylinder block to reinforce the intercooler is located at a portion of the housing to which the air bypass valve is connected.

5. The outboard motor according to claim 1, wherein the pressure charger includes a supercharger to be driven by rotation of the crankshaft.

6. The outboard motor according to claim 5, further comprising a second transmission to join the crankshaft and the supercharger together so that the supercharger always operates while the crankshaft is rotating.

7. The outboard motor according to claim 1, wherein the pressure charger includes a turbocharger to be driven by an exhaust gas passing through the exhaust passage.

8. The outboard motor according to claim 1, wherein the cylinder block includes a plurality of cylinders spaced apart along the vertical direction.

9. An outboard motor comprising:
  an engine including a cylinder block, an air intake passage connected to the cylinder block, an exhaust passage connected to the cylinder block, and a crankshaft located in the cylinder block;
  a propeller to be driven by the engine;
  a pressure charger in the air intake passage to compress air flowing through the air intake passage;
  an intercooler in the air intake passage between the cylinder block and the pressure charger to cool air compressed by the pressure charger;
  a bypass air passage to bypass the pressure charger and including a first end connected to a region of the air intake passage upstream of the pressure charger and a second end connected to a region of the air intake passage downstream of the pressure charger; and
  an air bypass valve directly attached to the intercooler to open and close the bypass air passage.

10. A vessel comprising:
  a hull; and
  the outboard motor according to claim 1 on the hull.

* * * * *